April 21, 1970      J. E. McWILLIAMS      3,507,411
METHOD FOR LOADING BAGGED MAIL FROM A LOADING
DOCK INTO A HIGHWAY VEHICLE
Filed Dec. 28, 1967      9 Sheets-Sheet 1
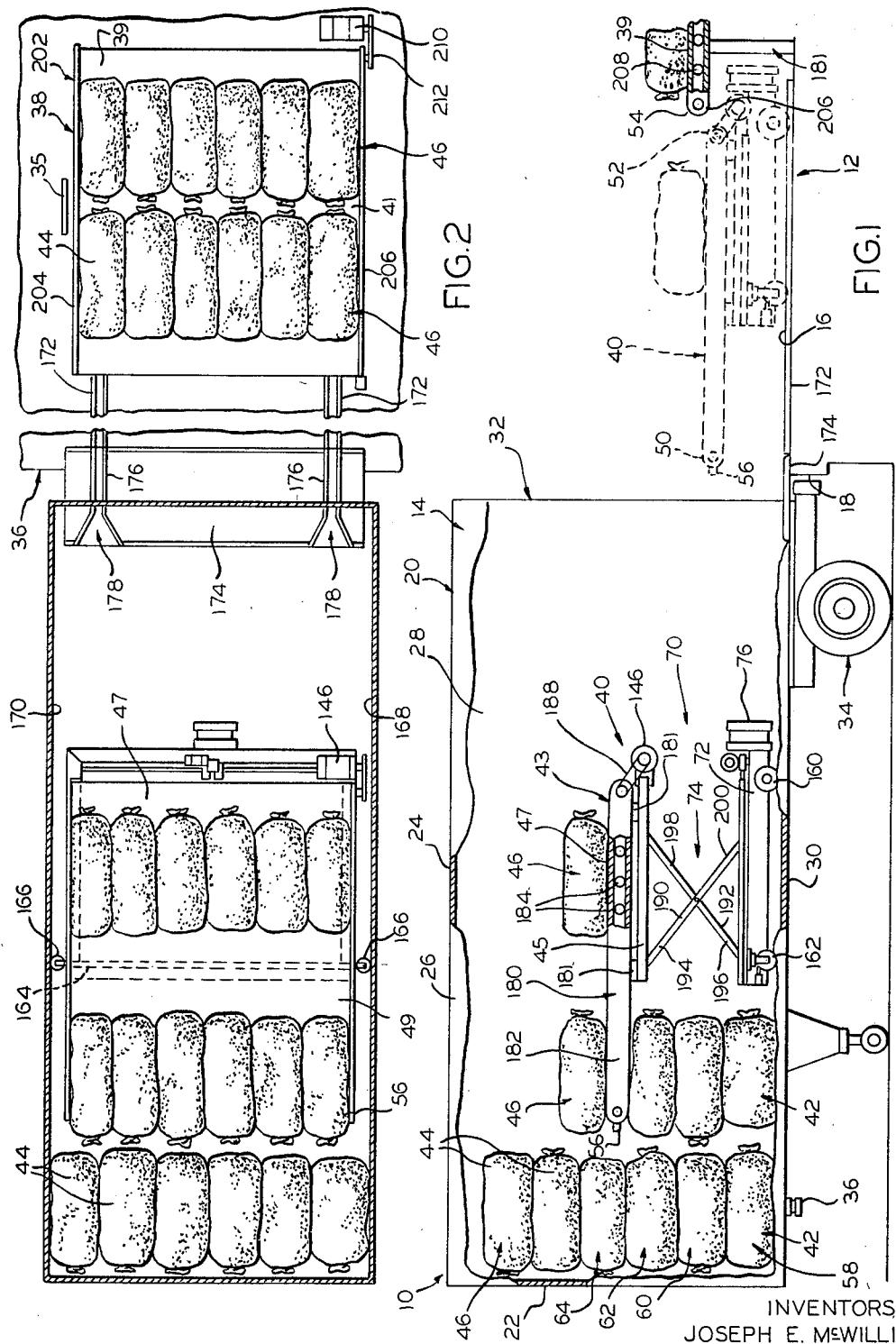
INVENTORS
JOSEPH E. McWILLIAMS
BY
Mann, Brown & McWilliams
ATTORNEYS

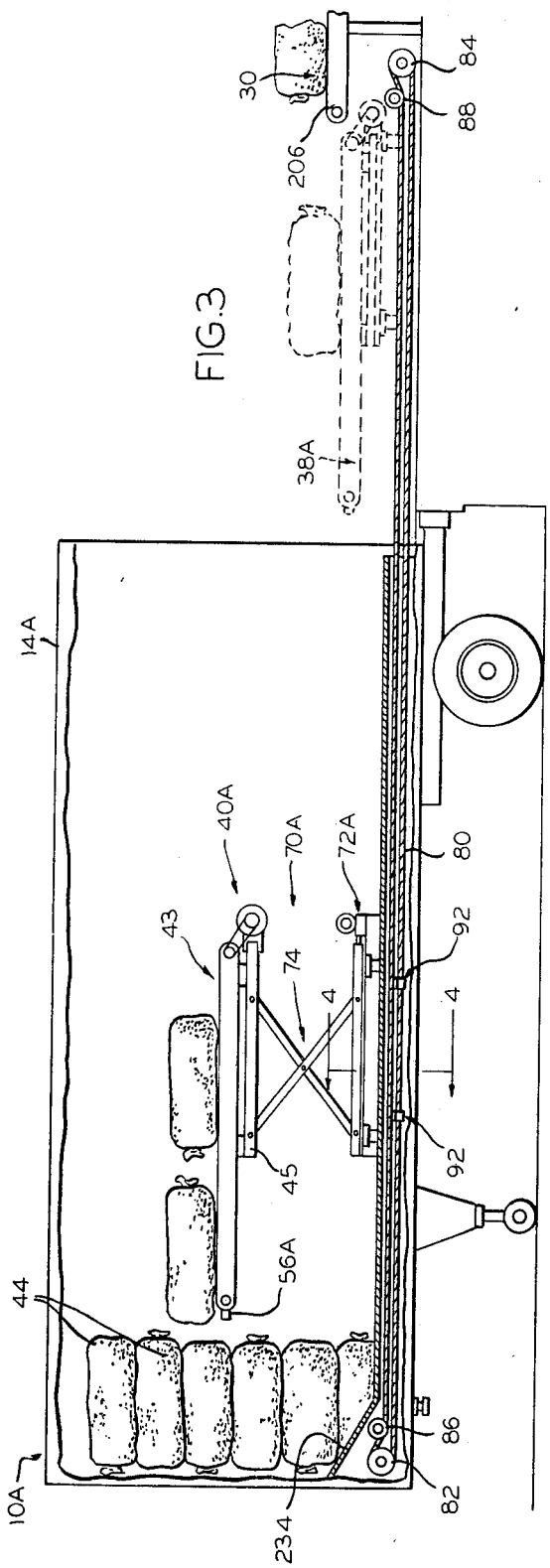
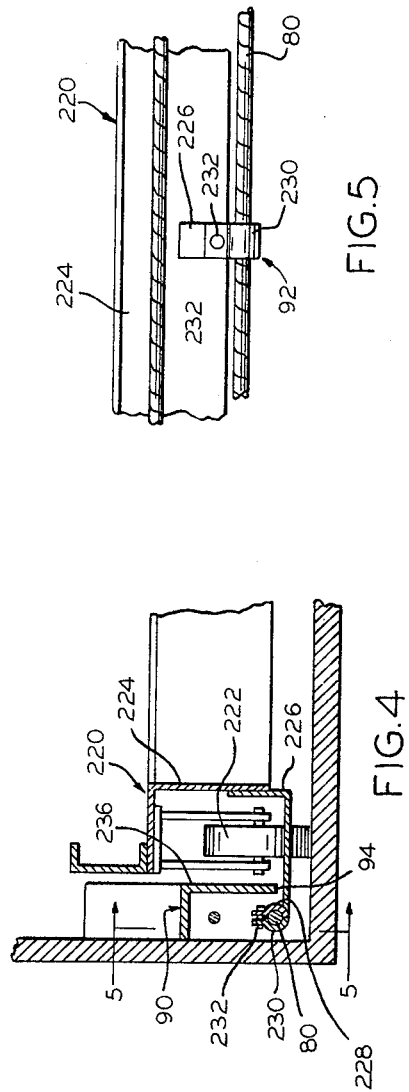

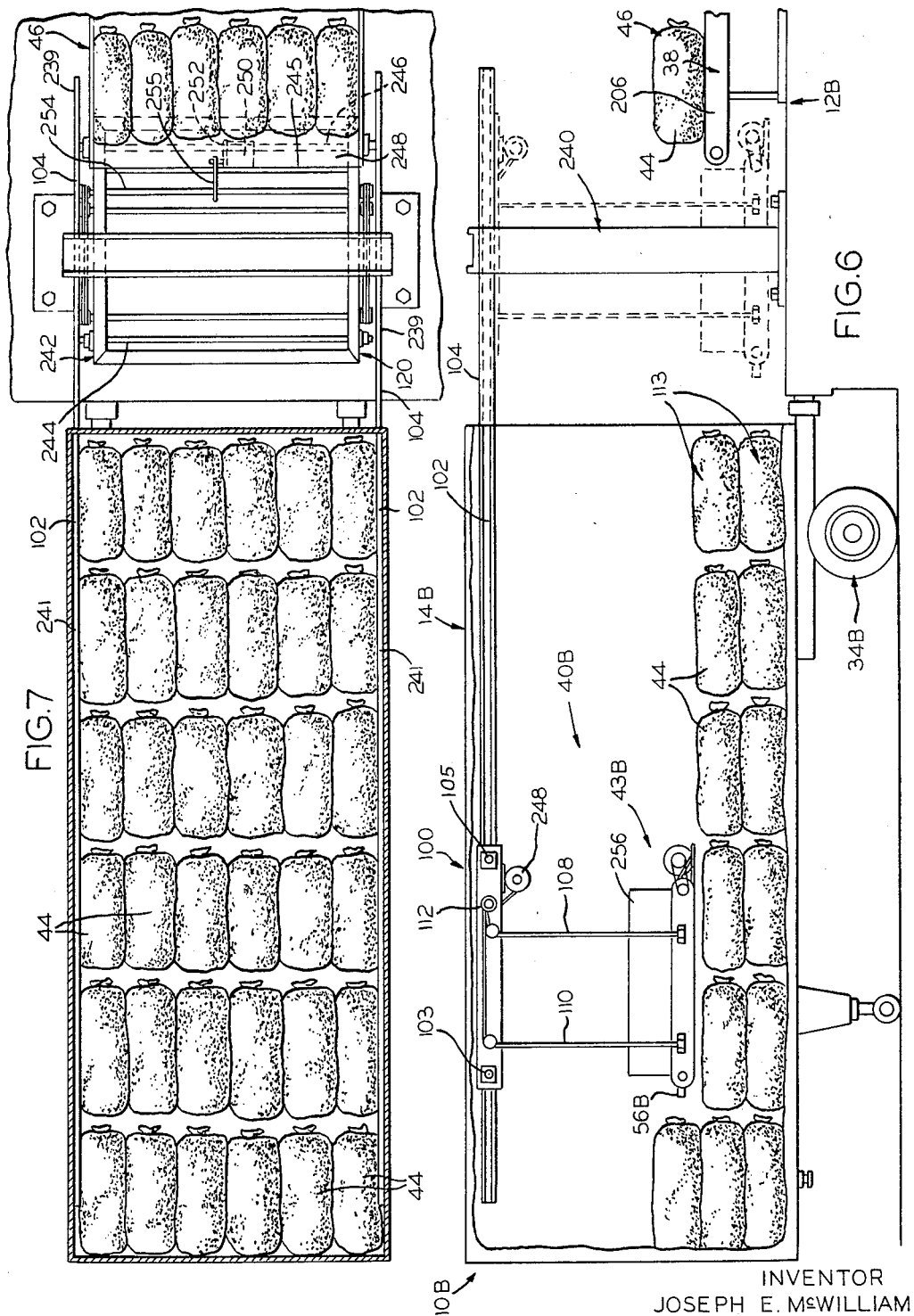

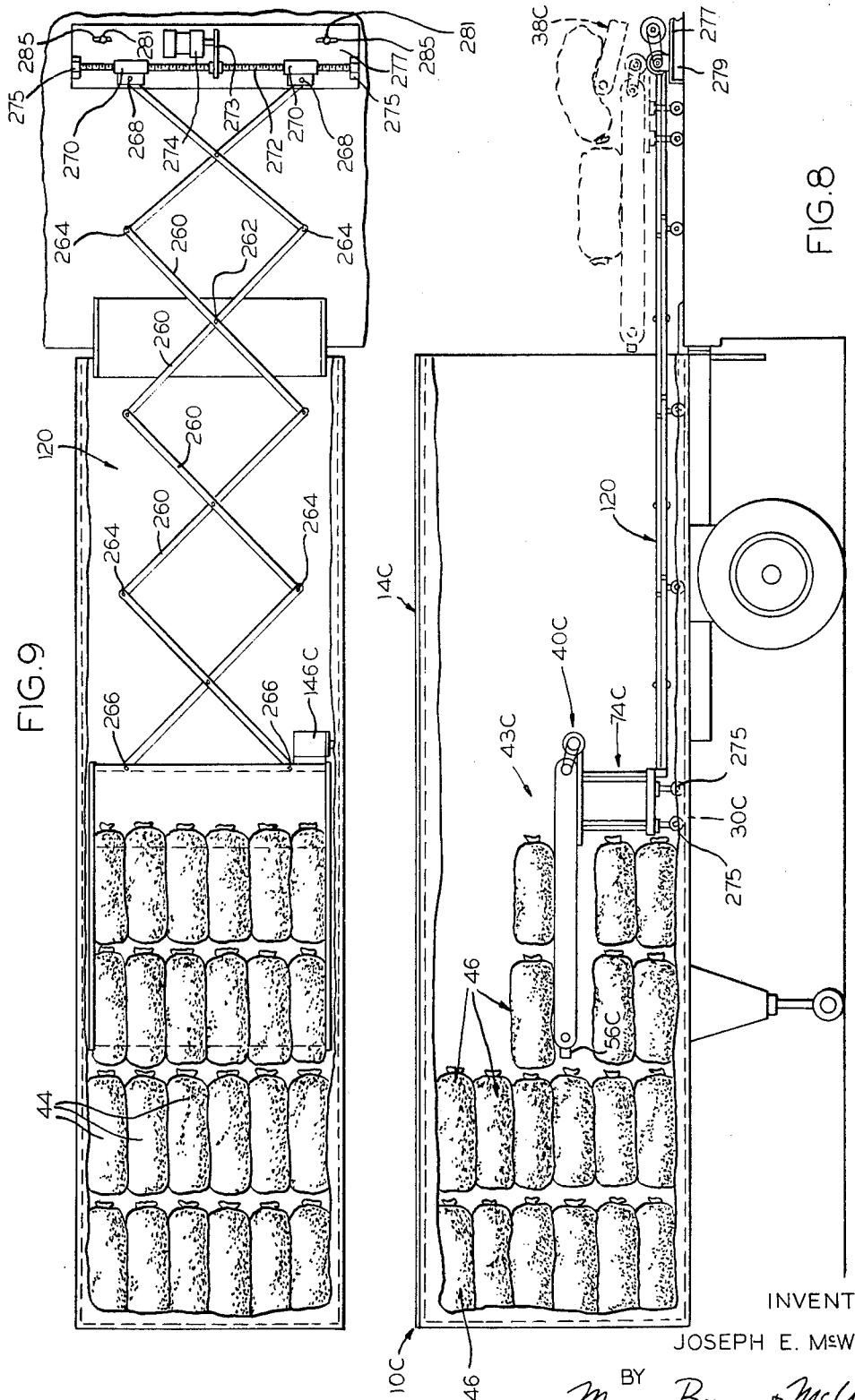

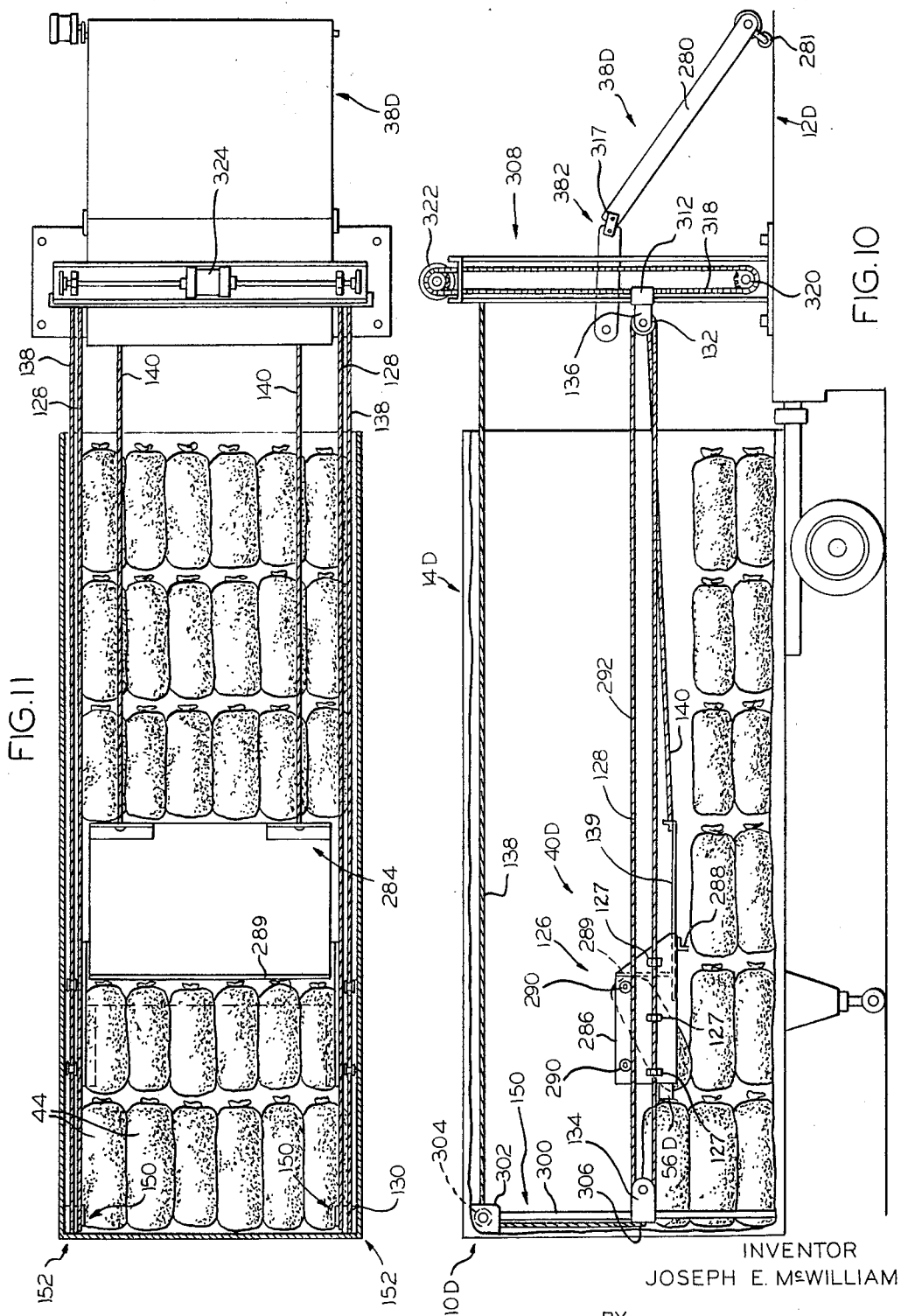

April 21, 1970   J. E. McWILLIAMS   3,507,411
METHOD FOR LOADING BAGGED MAIL FROM A LOADING
DOCK INTO A HIGHWAY VEHICLE
Filed Dec. 28, 1967   9 Sheets-Sheet 6

INVENTOR
JOSEPH E. McWILLIAMS
BY
Mann, Brown & McWilliams
ATTORNEYS

April 21, 1970

J. E. McWILLIAMS 3,507,411

METHOD FOR LOADING BAGGED MAIL FROM A LOADING
DOCK INTO A HIGHWAY VEHICLE

Filed Dec. 28, 1967

INVENTOR
JOSEPH E. McWILLIAMS

BY
*Mann, Brown & McWilliams*
ATTORNEYS

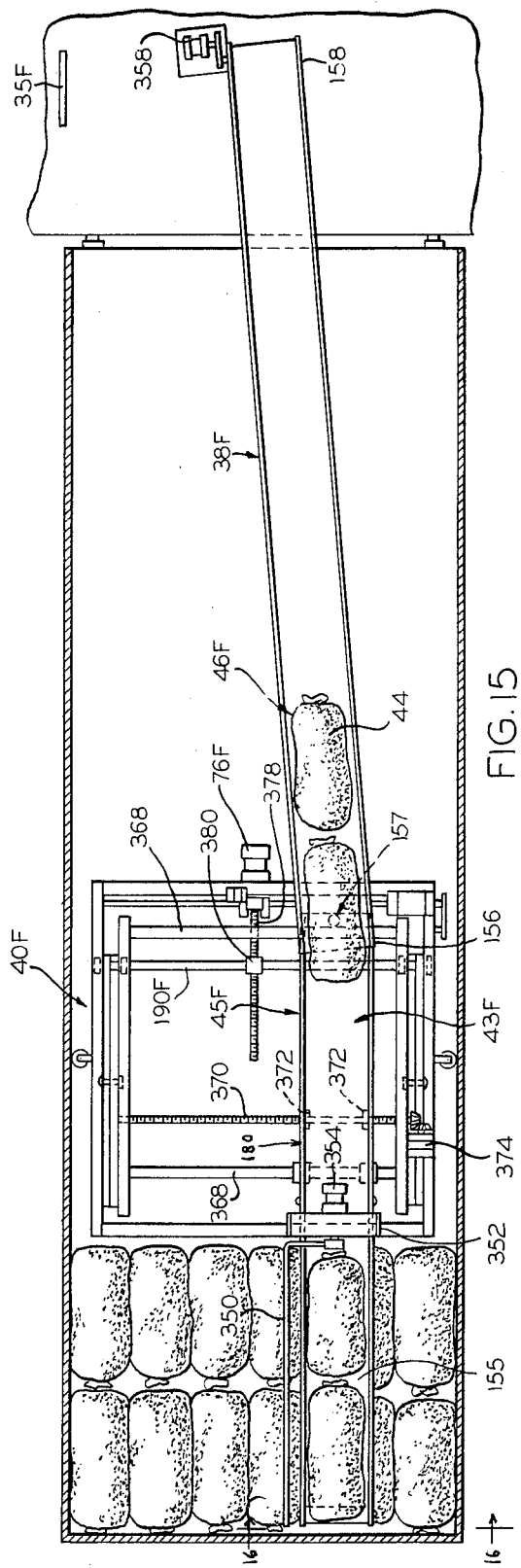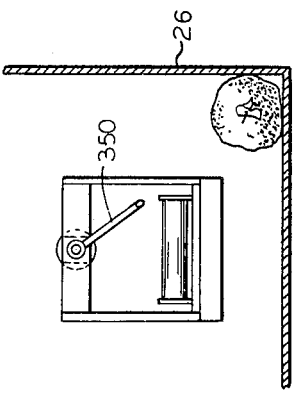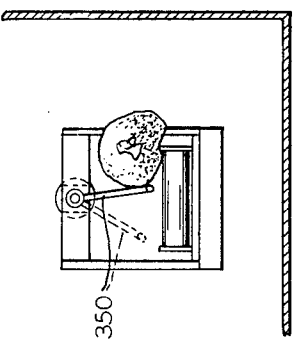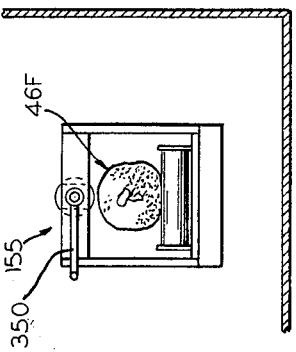

April 21, 1970  J. E. McWILLIAMS  3,507,411
METHOD FOR LOADING BAGGED MAIL FROM A LOADING
DOCK INTO A HIGHWAY VEHICLE
Filed Dec. 28, 1967  9 Sheets-Sheet 9
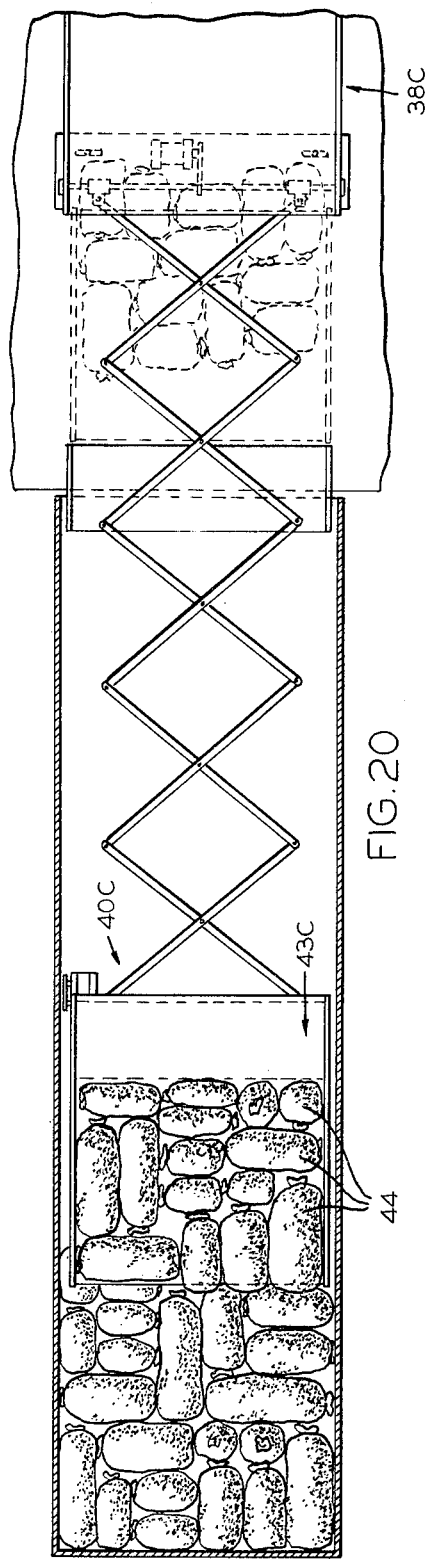
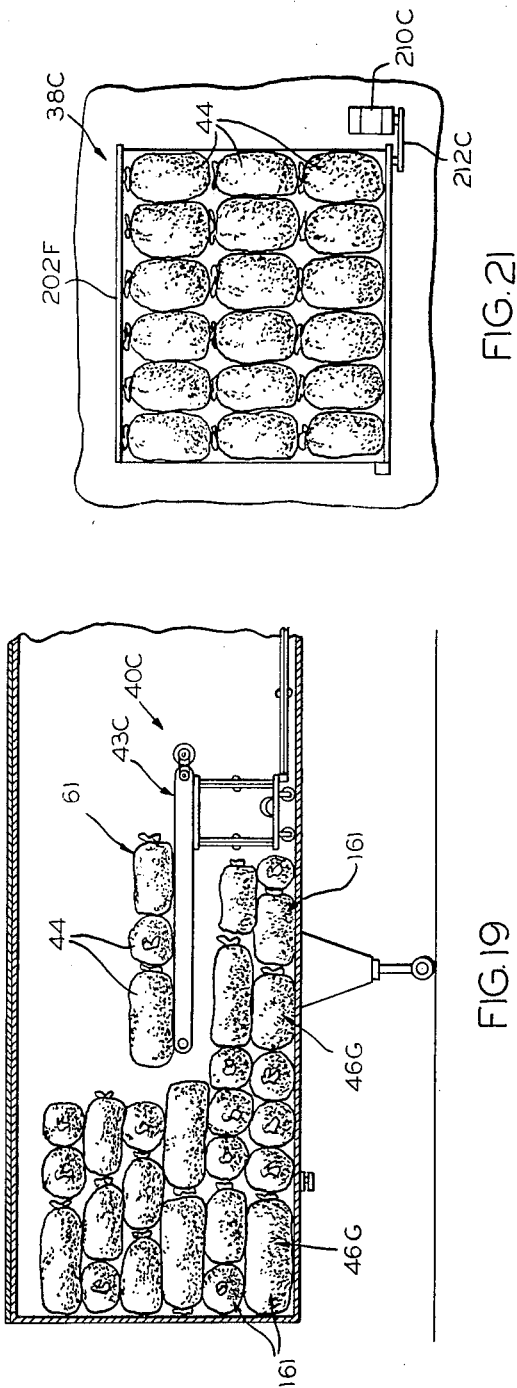
INVENTOR
JOSEPH E. McWILLIAMS
BY
Mann, Brown & McWilliams
ATTORNEYS United States Patent Office 3,507,411
Patented Apr. 21, 1970

3,507,411
METHOD FOR LOADING BAGGED MAIL FROM A LOADING DOCK INTO A HIGHWAY VEHICLE
Joseph E. McWilliams, 1345 Canterbury Lane, Glenview, Ill. 60025
Filed Dec. 28, 1967, Ser. No. 694,151
Int. Cl. B65g 57/24
U.S. Cl. 214—152                               7 Claims

ABSTRACT OF THE DISCLOSURE

The invention relates to the loading of mail bags from a loading dock into an end loading highway vehicle, such as a truck or a trailer, to fully load the vehicle with stacks of mail bags in which the bags are compactly loaded into place in individual stack forming tiers without those performing the bag loading operation having to enter the vehicle. In practicing the invention, the loading dock at the post office or the like is provided with a conveyor on which out-going bags are placed and oriented in closely spaced tier form. Operating between the conveyor and the highway vehicle is a carriage that receives the tier load without disturbing the orientation of the bags and brings the tier load into the vehicle loading area for discharge of the stack forming tier unit, and effects placement of the tier as part of a stack in the vehicle, again without disturbing the orientation of the bags. The carriage then returns to the conveyor for another tier load.

The carriage movements are controlled so that the individual tier loads are formed into vertical stacks of mail bags that are disposed to position the bags of adjacent stacks in closely spaced relation, with the vehicle being thus filled with bags throughout its load receiving area so as to make maximum use of the available loading space within the vehicle to maximize the pay load. The operation of the carriage is mechanized so that workers do not have to go into the vehicle, and palleting of the bags in groups is avoided while still achieving uniform loading in tier form.

Several specific arrangements for practicing the invention are disclosed in which the carriage either operates on the floor of the vehicle and loading dock, or is suspended for operation within the vehicle, wherein the carriage is either self-propelled or cable actuated, wherein the bags as loaded extend either longitudinally or transversely of the vehicle, and wherein the tiers employed as part of the loading procedure extend transversely or longitudinally of the vehicle.

---

This application is closely related to my application Ser. No. 627,217, filed Mar. 30, 1967, the filing date of which is claimed for all subject matter of the instant application that is common thereto.

This invention relates to a method and apparatus for loading bagged mail from a loading dock into a highway vehicle, and more particularly, to methods of and means for facilitating the handling of bagged mail in tiered groups for purposes of loading same into vehicles that are to transport it.

Conventional methods of loading mail bags into highway vehicles and trailers of the end loading type are not only time consuming and inefficient in nature, but also require much manual effort on the part of the workers involved. The bags are conventionally loaded so as to form vertical stacks in which the bags of each stack extend longitudinally of the vehicle and the stacks fill all available space vertically and lengthwise of the vehicle. The bags, which when loaded are from 12–14 inches wide and 36–40 inches long, are usually loaded up to about 92 inches above the floor of the truck in a space that is about eight feet wide, with the length depending on the length of the truck.

Heretofore the loading procedures have been largely manual in nature, with the workers involved dragging the individual bags into the vehicle from a pile of the bags on the adjacent loading dock, and then individually positioning and lifting the bag as is necessary to complete the formation of the respective bag stacks. At best, hand carts are sometimes employed to reduce some of the manual effort involved, but the handling required of each individual bag is still much the same; in both cases, much repetition of bag orienting movements is required for each bag, which is wasteful of effort and inefficient in terms of the time and cost of getting the job done. The result is that valuable equipment is unduly tied up to accommodate these slow loading procedures, and labor is in short supply as workers are becoming increasingly reluctant to take on jobs involving such hard work.

Nevertheless, the Post Office Department and others concerned with the transport of loaded mail bags, load something on the order of 50,000 trucks a day in the U.S.A. in this manner at a cost on the order of $18.00 a truck, which gives an indication of the magnitude of the problem.

My Patent 3,164,271, granted Jan. 5, 1965, discloses a basic system for handling bagged mail which involves the sorting and loading of incoming bags into load units that are grouped by distination and stored until arrival of a suitable load transport vehicle whereupon the tier load units are unloaded in single or multiple tier form in the vehicle.

A principal objective achieved by the methods and apparatus disclosed in said patent is that the mail bags are oriented early in the cycle of their handling operations and this initial orientation is maintained throughout all of the subsequent handling operations.

A principal object of the present invention is to provide methods and apparatus for further facilitating the loading of end opening vehicles without requiring that the operator enter the transport vehicle or that the mail bags be palleted in groups to reduce individual handling.

Another principal object of this invention is to provide a method of loading bagged mail in transport vehicles in closely spaced relationship to the end that the available air spaced within the vehicle will be loaded to the maximum and all manual motions ordinarily required to handle the bags within the vehicle are performed by mechanical means arranged to carry, elevate as necessary and deposit the bags in the compact relationship necessary to maximize the pay load by substantially filling the available cubic loading space of the vehicle.

Another principal object of the invention is to provide methods and apparatus for loading of end opening vehicles such as motor trucks and trailers which permits a single operator to efficiently load the entire transport vehicle without stepping inside it.

Still other objects of the invention are to provide apparatus for loading bagged mail in transport vehicles that is adapted for full push button type actuation and control, to provide methods and apparatus for handling bagged mail that permits substantially automatic handling of the mail in tiered load groups, and to provide mail bag handling apparatus that is economical of manufacture, convenient in use, and adapted for all conventional mail bag loading dock areas and vehicles or their equivalents.

Other objects, uses, and advantages will be obvious or become apparent from a consideration of the following detailed description and the application drawings.

In the drawings:

FIGURE 1 is a diagrammatic side elevational view of a semi-trailer in the process of being loaded in accordance with my present invention, with parts being broken away, and the mail bag tier carrying carriage being shown in its load receiving position in its dashed line position while its full line position shows one of the load discharging positions thereof;

FIGURE 2 is a plan view of the apparatus shown in FIGURE 1, with the conveyor that supplies the tier forming load to the carriage being shown in full plan;

FIGURE 3 is a view similar to that of FIGURE 1 but illustrating a modified form of the invention;

FIGURE 4 is a fragmental cross-sectional view substantially along line 4—4 of FIGURE 3;

FIGURE 5 is a fragmental view substantially along line 5—5 of FIGURE 4;

FIGURE 6 is a view similar to that of FIGURE 1 but illustrating a further embodiment of the invention;

FIGURE 7 is a plan view of the arrangement shown in FIGURE 6;

FIGURE 8 is a view similar to that of FIGURE 1 illustrating still another embodiment of the invention;

FIGURE 9 is a plan view of the arrangement shown in FIGURE 8;

FIGURE 10 is another view similar to that of FIGURE 1 showing still further modified form of the invention;

FIGURE 11 is a plan view of the arrangement shown in FIGURE 10;

FIGURE 15 is a plan view of the apparatus shown in FIGURE 14;

FIGURE 16 is a fragmental cross-sectional view along line 16—16 of FIGURE 15;

FIGURES 17 and 18 are similar to that of FIGURE 16 illustrating the manner in which the bag tiers formed by practicing this embodiment are unloaded into place within the vehicle;

Figure 13:
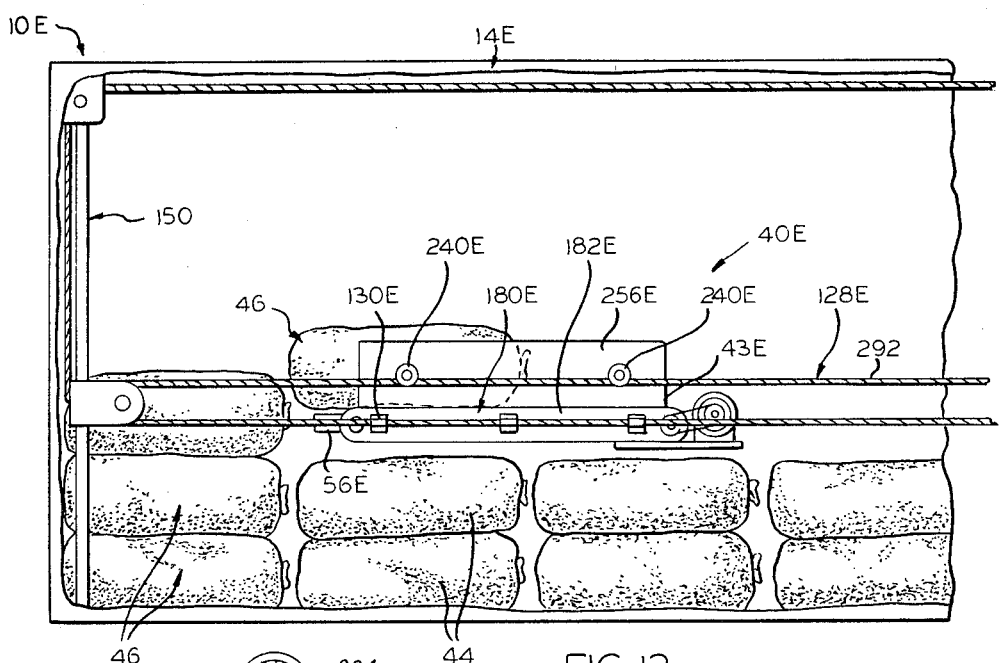
FIGURE 13 is a view similar to that of FIGURE 10 illustrating a varient form of the embodiment of FIGURE 10.

FIGURES 19 and 20 show the apparatus of FIGURES 8 and 9 being employed to load the mail bag into the vehicle using another type of bag orientation in accordance with this invention; and FIGURE 21 is a plan view of the carriage of FIGURES 8 and 9 loaded with mail bags utilizing still another type of bag orientation in accordance with this invention.

However, it is to be distinctly understood that the specific embodiments of the invention illustrated are supplied primarily to comply with the requirements of the patent code, and that the invention may have other embodiments that are intended to be covered by the appended claims.

GENERAL DESCRIPTION

Reference numeral 10 of FIGURE 1 generally indicates one embodiment of the present invention that incorporates the basic approach of the present invention for loading mail bags from a loading dock 12 into an end loading vehicle 14, which has been illustrated as being in the form of the familiar semi-trailer, although the invention is readily applicable to any end loading vehicle.

It is assumed that the mail bag handling installation involved includes the loading dock 12 (of a post office or the like) that is conventionally provided with a level load support surface 16 and the usual shoulder or end 18 against which the vehicle 14 is backed up for purposes of being loaded.

It is also assumed that the vehicle 14 be in the form of the usual body 20 defined by forward end wall 22, top wall 24, side walls 26 and 28, floor 30, and end opening 32 that is customarily closed by suitable doors or the like (not shown). The body 20, being of the semi-trailer type, rides on the usual rear wheels 34 and is provided with the usual kingpin 36 for connection to the fifth wheel of a conventional tractor truck (not shown).

In accordance with this invention, there is associated with the loading dock 12 at the position 36 where the vehicle body 14 is to be stationed for loading purposes a mail bag receiving conveyor 38 and a mail bag tier conveying carriage or carrier 40, which receives the mail bags accumulated in tier form on conveyor 38, transports them into the vehicle 14 and discharges them in tier form to form mail bag stacks 42.

Under ordinary circumstances, the loading dock 12 is located at a post office or the like where loaded mail bags are processed for shipment to their destinations and as indicated in FIGURE 2, the conveyor 38 and the carriage 40 are longitudinally aligned with the vehicle 14 (in the loading position of the vehicle) and have a width transversely thereof to accommodate enough mail bags laid side by side in a row to form one complete tier of a stack 42, such that when the tier is placed within the vehicle 14, it will extend substantially from one side wall 26 to the other side wall 28 as indicated in FIGURE 2. Conveyor 38 is in the form of conveyor belt 39 defining a substantially horizontal load supporting surface 41 on which the bags 44 are placed, which surface is at an easy reach height above surface 16, such as two to three feet high. Carriage 40 includes a load support in the form of conveyor 43 supported by vertically movable platform 45, which conveyor 43 is in the form of a conveyor belt 47 defining load support surface 49.

In practicing my invention, the mail bags are brought in any suitable manner to the area of the conveyor 38 and they may be piled at random adjacent the conveyor 38 for ready access by one or more workers stationed adjacent the conveyor 38 for purposes of controlling the operation of same and carriage 40. In accordance with this invention, the controls for conveyor 38 and carriage 40 are arranged so that these pieces of apparatus are operated without anyone having to go into the vehicle 14, as will be hereinafter described in connection with each of the embodiments of the invention illustrated in the drawings. For this purpose, the controls may be of the push button type applied to suitable control panel 35 and may be of any suitable electric and/or electronic type that will serve the purpose.

To practice my invention, after the vehicle 14 is positioned as shown in FIGURES 1 and 2 for loading (assuming it is empty), and the bags to be shipped are disposed, for instance in a pile or piles adjacent the conveyor 38, the worker or workers in the area of conveyor 38 pick up and position enough of the individual bags 44 to form one or more tiers 46 (of six to eight bags in a tier) on the belt 39 of conveyor 38 in which, in accordance with the procedure contemplated by this embodiment of the inventions, the bags of each tier 46 are placed in closely-spaced side by side relation and extend longitudinally of the conveyor 38 and vehicle 14.

When one or more tiers 46 have been applied to conveyor 38 in the manner indicated (which tiers are termed a "partial transport vehicle load depth unit" in the appended claims), the carriage 40 is positioned as shown in dashed lines in FIGURE 1, and the conveyor 38 is actuated to deposit simultaneously all the bags 44 forming the first tier 46 on the carriage conveyor 43. The carriage conveyor 43 is simultaneously actuated to move the first tier down to a position adjacent its forward end 50, it being noted that the rear end 52 of the conveyor 43 is disposed in load receiving relation with respect to the forward end 54 of the conveyor 38, after which the second tier is similarly applied to conveyor 43.

The carriage 40 is then actuated to move same from the dashed line position of FIGURE 1 into the vehicle 14 where it moves toward the front wall 22 of the vehicle to start the first stack of mail bags. Assuming that the vehicle 14 is completely empty, the carriage 40 moves forwardly of the vehicle 14 until its forward end 50 engages the wall 22, which actuates a suitable limit switch arrangement such as that indicated at 56 to stop the forward movement of the carriage 40 and actuate conveyor 43 as well as reverse the movement of the carriage 40 in such a manner that as the carriage 40 moves rearwardly of the vehicle 14, the first tier 46 of bags 44 is conveyed forwardly at a similar speed (for a net speed of zero relative to vehicle 14), and is dropped onto the floor 30 of the vehicle adjacent the end wall 22 in the position indicated at 58. Rearward movement of the carriage 40 is then stopped and the conveyor 43 is then actuated to move up to its forward end 50 the next tier 46 of bags 44, whereupon the carriage 40 is again advanced toward forward wall 22 until limti switch 56 is actuated which again stops forward movement of the carriage 40 and actuates simultaneous operation of conveyor 43 and rearward movement of carriage 40 to discharge the next tier of bags (in the manner indicated above) where indicated at 60.

The carriage 40 is then returned to the dashed line position of FIGURE 1 to receive the next two tiers 46 of mail bags 44, which can be formed onto the conveyor 38 while the carriage 40 is operating in the manner that has just been described. These next two tiers are then unloaded in a similar manner where indicated at 62 and 64, respectively, the carriage conveyor 43 being elevated as required to place the latter tiers on top of those already in place.

The next two tiers are stacked similarly to form the completed stack 42 adjacent the wall 22, after which the stacking process is repeated to form the next adjacent stack 42, as indicated by the solid line positioning of the carriage 40. This process is repeated until the stacks 42 have been formed length of vehicle 14, after which the vehicle open end 32 is secured in the usual manner and the vehicle 14 driven off to be replaced by a similar vehicle 14 to be loaded.

The handling of the bags in moving them from the conveyor 38 to their respective positions in the vehicle 14 is thus carried out after having made a single orientation of the bag as to the position it is to take in a particular stack forming tie, and without having to drop the bag over the 24 inch limitation provided by Post Office regulations.

From the description so far there are several important features to be observed. Note for one thing that the bags 44 are properly oriented in their tiers 46 by their application to the conveyor 38, and that this orientation is maintained throughout the further handling of the bags that moves them into stacked relation in the vehicle 14. Furthermore, the lifting and positioning of the bags 44 onto conveyor 38 is the only manual labor involved, and the worker is concerned with only an easy lifting and positioning action at a convenient working height above surface 16, with such action needing only to be performed once per bag.

It is also to be noted that the loading of the vehicle 14 is done without anyone having to enter the vehicle 14 and palletizing of the individual tiers 14 is unnecessary.

In the specific arrangement of FIGURES 1 and 2, the carriage 40 is in the form of a self propelled vehicle 70 including wheeled frame 72 which supports the platform 45 and conveyor 43 through a suitable cross lever type elevating mechanism generally indicated at 74. The vehicle 70 is powered by a suitable power unit 76, the controls of which and those of elevating mechanism 74 and conveyor 43 are arranged in any suitable manner for control by an operator standing outside of the vehicle 14 in the area of conveyor 38, and for the automatic functioning that has been indicated.

In the embodiment of 10A of FIGURES 3–5, the carriage 40A is in the form of a vehicle 70A associated with supplementary pulling equipment operably arranged between the dock 12A and the vehicle in a manner that will permit the vehicle to be loaded and depart from any desired destination. In the form of these figures, the carriage vehicle 70A is attached at either side thereof to cable 80 that are disposed on either side of the vehicle 14A about suitable end pulleys 82 and 84 and under suitable bend pulleys 86 and 88 that are carried by vehicle 14A. In this form of the invention, the vehicle 14A has the pulleys 82 and 86 permanently mounted thereon and the respective cables 80 are applied thereto underneath the shield 90 indicated in FIGURE 4. The respective cables 80 are secured to the vehicle 72 by a pair of clamp devices 92 on either side thereof.

In this embodiment of the invention, as part of readying the vehicle 14A to receive its mail bag load, the cables 80, which are in the form of closed loops, and may remain permanently trained about pulleys 84 and 88, are stretched into the vehicle 14A, slipped under the lower edge 94 of the respective shields 90 and applied to the respective pulleys 82 and 86 in the manner indicated after which they may be suitably tensioned (as by making pulleys 84 and 88 adjustable longitudinally of conveyor 38A) so that when the end pulley 84 is driven (in any suitable manner), the vehicle 70A will reciprocate or cycle in the manner that has been described. The cover 90 permits the mail bags to be applied in place in the manner described, and when the loading has been completed following the procedures already described, the ends of each cable 80, which for each cable 80 are connected together by a suitable quick disconnect coupling device (not shown) to form the closed loop, are separated and the cable withdrawn from the vehicle 14 so that it may move onto its destination.

In the form 10B of FIGURES 6 and 7, the carriage 40B comprises conveyor 43B suspended from a trolley 100 that operates in trackways 102 and 104 that are mounted on the vehicle and loading dock 12A on either side of the path of movement of the carriage 40B and are adapted to be aligned and placed in substantial abutting relation when the vehicle 14B is backed into its load receiving relation with respect to loading dock 12A. The trolley 100 includes rollers 103 and 105 that ride in the respective trackways so that the carriage 40 can move between the dashed and full line positions of FIGURE 6. The rollers 105 are driven in any siutable manner and the conveyor 43B is supported by cables 108 and 110 that are connected to a powered reel 112 for simultaneously winding and unwinding them as it is necessary to raise and lower the carriage 40B in the practice of my invention. The individual stacks 42 of mail bags may be formed in the manner already described, or they may be formed by filling in the vehicle 14B by consecutively forming horizontally disposed layers 113 of tiers 46 as indicated on FIGURE 6.

In the embodiment 10C of FIGURES 8 and 9, the carriage 40C rides on the floor 30C of the vehicle 14C and is actuated by a lazy tong linkage generally indicated at 120. The loading procedures described in connection with the embodiment of FIGURES 1 and 2 may be followed in utilizing the embodiment 10C.

In the form 10D of FIGURES 10 and 11, the carriage 40D is in the form of a carrier 126 suspended between cables 128 mounted on either side of the vehicle in the form of closed loops and trained over suitable end pulleys 130 and 132. Pulleys 130 and 132 are respectively journalled in the respective vertically movable supports 134 and 136 which are horizontally aligned and simultaneously raised and lowered by operation of cables 138 in association with the mechanism best illustrated in FIGURE 12. The carrier 126 is fixed to the respective cables 128 at lugs 127 and the cables 128 are powered by a suitable drive mechanism to cycle the carriage 40 in the manner already indicated. In the specific form illsutrated in FIGURES 10 and 11, which may be utilized to practice the procedures referred to in connection with the embodiment of FIGURES 6 and 7, the carrier 126 forming the carriage 40D is formed with a retractable shelf 139 on which a mail bag tier 46 is placed by operating the conveyor 38D, and when the carrier 126 is positioned to dispose the tier of bags over the spot they are to be dropped into, the shelf 139 is drawn to the discharging position shown in FIGURE 10 by pulling on cables 140 through any suitable mechanism under the control of the operator (without moving the carriage 40D rearwardly of the vehicle).

Figure 12:
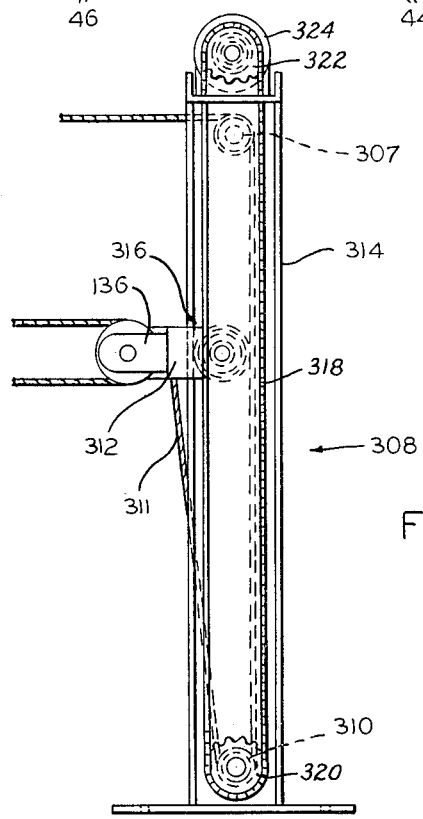
FIGURE 12 is a fragmental side elevational view of the loading dock supported frame forming a part of the embodiment of FIGURE 10, better illustrating the manner in which the illustrated cables are associated therewith.

In the varient form 10E shown in FIGURE 13, the carriage 40E is actuated in the manner illustrated in FIGURES 10–12 but comprises a conveyor 43E that is powered for discharging the mail bag tiers 46 in the manner already described.

In both the forms of FIGURES 10–12 and 13, the cables 128 and the support members 134 cooperate with special prop devices 150 permanently located at the respective forward corners 152 of the vehicle 10D.

Figure 14:
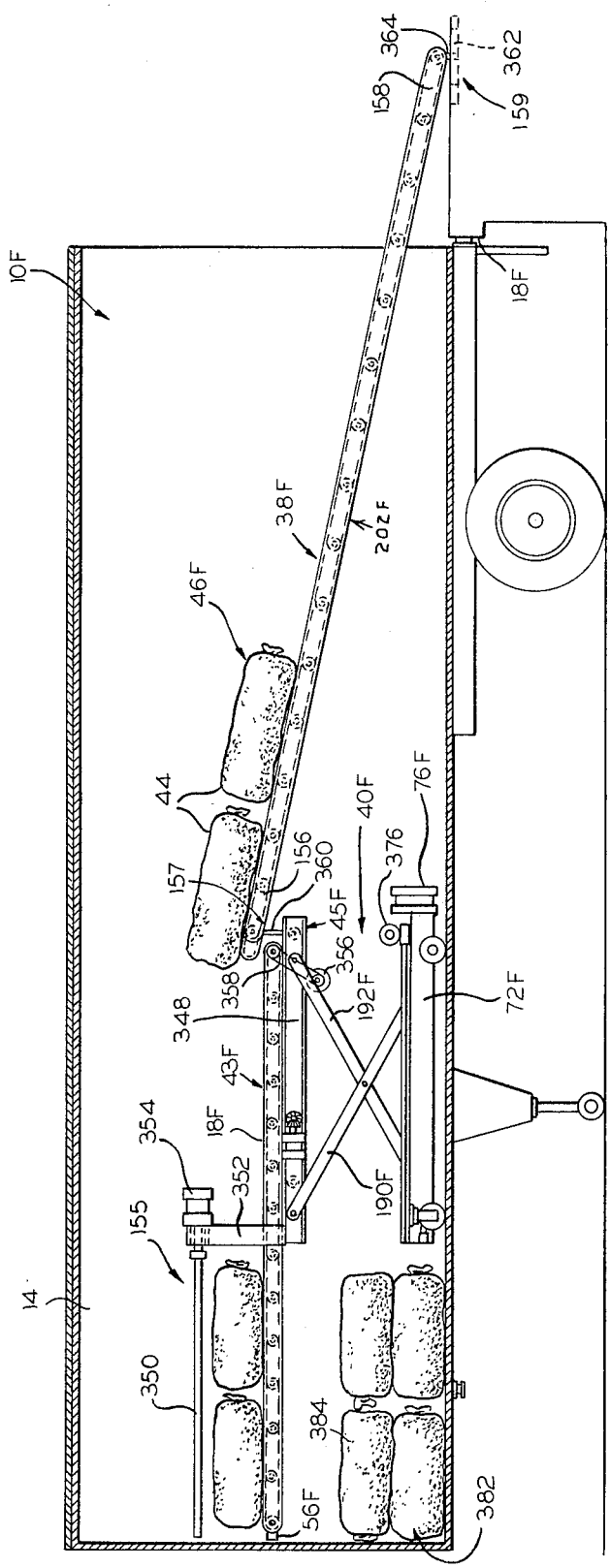
FIGURE 14 is a view similar to that of FIGURE 1 illustrating yet a further modified form of the invention.
Figure 14A:
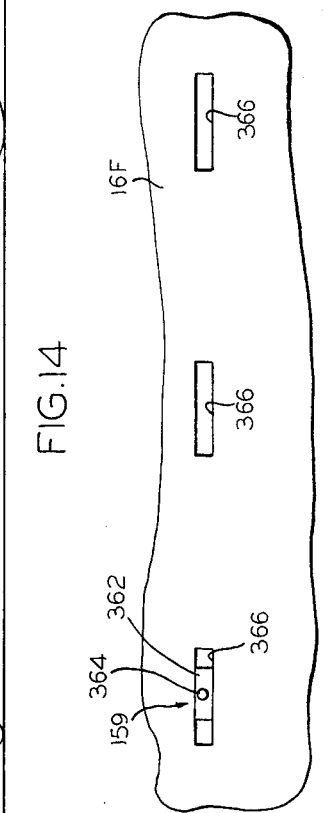
FIGURE 14A is a fragmental plan view of a portion of the loading dock at the right of FIGURE 14.

In the modified form (10F) of FIGURES 14–18, the carriage 40F is similar to carriage 40 of FIGURES 1 and 2 and carries a conveyor 43F that receives bags 44 in single row tier or load unit form, in which the bags of the tier or load unit 46F extend longitudinally of the vehicle, from conveyor 38F on which the tiers 46F are made up, and which is connected to carriage 40F for supplying the bags thereto after carriage 40F has been positioned to unload tiers 46 sidewise of the vehicle to form the stacks of tiers in the vehicle. In this form of the invention, the bags are unloaded by employing the mechanism indicated at 155, and conveyor 43F is shifted sidewise of the vehicle to position same to drop off the next tier of bags (extending longitudinally of the vehicle) that is formed by operating conveyor 38F. In this particular form the parts are arranged so that a tier 46F made up of two bags extending longitudinally of the vehicle is accommodated for each bag loading position of carriage 40F. The end 156 of conveyor 38F is pivoted to conveyor 43F as at 157 to accommodate lateral shifting of conveyor 43F, and the other end 158 thereof is removably pivoted in the loading dock as at 159 at one of several pivoting locations (see FIGURE 14A) that will define the several operating stations of carriage 40F required to fully load vehicle 14.

In the showing of FIGURES 19 and 20, the bags 14 forming the load unit are initially loaded onto the conveyor 38C in a different pattern of orientation, that is, instead of all the bags of the load unit extending longitudinally of the conveyor 38C, the bags are at random closely spaced positions with respect to each other, which relative positions are maintained during further handling of the bags by operating carriage 40C and its conveyor 43C in the manner already suggested to deposit the bags in the stacks 46G (each layer 161 of which is made up of a random positioned bag load from conveyor 38C) except that the individual layers 161 are laid down during a continuous rearward movement of carriage 40C with respect to the vehicle at a rate equivalent to the discharging speed of conveyor 43C. The initial positioning and orientation of the bags 44 on the conveyor 38C in accordance with the method of FIGURES 19 and 20 (similar to all procedures herein described) is such to obtain maximum utilization of available storage space within the vehicle when fully loaded in the manner suggested by these figures.

In the showing of FIGURE 21, the bags 44 forming the individual load units are loaded on conveyor 38C oriented to extend transversely of the conveyor, and are loaded into the vehicle by forming stacks in the manner already indicated, with the transverse orientation of the bags being maintained. Here again, the bags are oriented in closely spaced relation on the dock supported conveyor to form the individual load units, and are conveyed, elevated and deposited in load unit form within the vehicle while maintaining the initial bag orientation and substantially filling the available storage space within the vehicle.

SPECIFIC DESCRIPTION

Referring back now to the embodiment 10 of FIGURES 1 and 2, this embodiment of the wheeled frame 72 of carriage 40 rides on rear wheels 160 (that are powered in any suitable manner by electric motor 76) and forward casters 162 that are connected together by the guide bar 164 (best shown in FIGURE 2) that is provided with end rollers 166 that engage the inside surfaces 168 and 170 of the respective vehicle side walls 26 and 28 to guide the carriage 40 in its cycling movements within the vehicle 14. On loading dock 12 the wheels 160 and casters 162 ride in suitable guiding trackways 172. Applied between the loading dock 12 and the floor 30 is a suitable bridge plate 174 provided with trackways 176 that are to be aligned with the trackways 172, and that are enlarged or flared as at 178 so that the wheels 160 are suitably guided back into the trackways 176 on rearward movement of the carriage 40 outward of the vehicle 14.

The conveyor 43 comprises a suitable frame 180 including side pieces 182 joined together in any suitable manner that journal rollers 184 that support the belt conveyor 47 and are mounted on suitable supports 181. Belt conveyor 47 is driven by a suitable electric motor 146 that drives the conveyor end pulley through suitable pulley belt 188.

The elevating mechanism 74 may be of any suitable type and in the form shown comprises cross levers 190 and 192 which have their ends 194 and 196 respectively pivoted to the platform 45 and wheeled frame 72, respectively, and their other ends 198 and 200 operating in suitable ways (not shown) with one of them being drawn forwardly of the wheeled frame 72 by a suitable screw and nut type device or the like to raise the platform 45 from the lowered position to the upper position of the two positions shown in FIGURE 1.

Conveyor 38 of the embodiment of FIGURES 1 and 2 is in the form of a frame 202 including side members 204 and 206 in which are journalled the rollers 208 that support the belt conveyor 39. Belt conveyor 39 is driven by a suitable electric motor 210 driving the adjacent conveyor end pulley through pulley belt 212 or the like.

The bridge plate 174 may be secured in its illustrated operating position in any suitable manner as by employing latch bars or the like (not illustrated).

In the embodiment of FIGURES 3–5, the wheeled frame 72A of carriage 40A comprises a suitable framework 220 riding on suitable wheels 222 journalled in place in any suitable manner. The frame 220 includes on either side thereof a flange member 224 having affixed thereto as by welding an angle member 226 having secured to its end a clamp element 228 of each clamp device 92 which is clamped to the cable 80 by an associated clamping element 230 held in place by suitable bolt 232.

At the forward end of cover 90, the cover flares upwardly as at 234 to accommodate the pulleys 82 and 86. The portion of the side 236 of the cover 90 in this area of the vehicle preferably is a hinged member (not shown) to provide for ready access to the pulleys 82 and 86 when the cable 80 is being applied thereto in the manner already described. The hinged member will drop over pulleys 82 and 86, which are suitably journalled in the respective side walls of vehicle 14A.

In the embodiment of FIGURES 3–5, the conveyor 38, and the lift mechanism 74 and conveyor 43 of carriage 40A are the same as described in connection with the embodiments of FIGURES 1 and 2. Pulleys 84 and 88 are preferably mounted on a suitable frame that is mounted for sliding movement longitudinally of conveyor 38 and arranged to be releasably fixed in place when the respective cables 80 are suitably tensioned.

In the embodiment of FIGURES 6 and 7, the trackways 104 that support trolley 100 on dock 12B comprise channel members 239 that are mounted on a suitable supporting framework 240 that is of generally U-shaped configuration so that the conveyor 43B may be moved to the low level dashed line position of FIGURE 6 for ready unloading of the conveyor 38 onto the conveyor 43B. The trackways 102 comprise channel members 241 secured to the side walls 26B and 28B of vehicle 14B for horizontal alignment with the respective channels 239 when the vehicle 14B is backed into its loading position. The rear wheels 34B of the vehicle 14B may be equipped with a suitable air spring arrangement or the like adapted to achieve exact vertical alignment of the adjacent ends of the respective channels 239 and 241 when vehicle 14B is backed to its loading position. Suitable bridge pieces (not shown) may be applied between such ends of channels 239 and 241 to facilitate the ready movement of trolley 100 between trackways 102 and 104.

The trolley 100, which in the full line position of FIGURE 7 has the dashed line position of FIGURE 6, comprises a suitable frame 242 provided with suitable cross shafts 244 and 245 with which the respective rollers 103 and 105 are operably associated, roller 105 being keyed to the shaft 245 that is driven by suitable electric motor 248. Motor 248 operates through suitable transmission 250 which selectively drives the shaft 245 through the sprocket and chain drive indicated at 252, or the shaft 254 that is keyed to the reels 112 (through the chain and sprocket drive indicated at 255) for simultaneous winding and unwinding cables 108 and 110 to raise and lower the carriage 40B.

The conveyor 43B comprising the carriage 40B in the form shown includes upright guide plates 256 on either side of the frame between which the bags 14 forming the tier 46 are disposed but is otherwise the same as conveyor 43.

In the embodiment 10C of FIGURES 8 and 9, the lazy tong linkage 120 is in the form of a plurality of interconnected levers 260 pivotally connected as at 262 and 264, in which one end of the lazy tongs is pivotally connected to the carriage 40C, as at 266.

The lazy tongs 120 at its other end is pivotally connected as at 268 to a pair of nut members 270 cooperating with a screw shaft 272 driven by motor 274 (through pulley belt 273 and suitable pulleys) for purposes of extending and contracting the lazy tongs. The shaft 272 is journalled in suitable bearing devices 275 and is threaded to move the nut devices 270 toward each other in one direction of rotation to extend the lazy tongs, and to move the nut devices in the opposite direction to retract the lazy tongs and thus move carriage 40C between its extended and retracted positions. Bearing devices 275, which may be of the pillow block type, and motor 274 are mounted on upper mounting plate 277 resting on support 279 and mounted for adjustment laterally of the path of movement of carriage 40C by adjusting clamp cap nuts 281 that cooperate with threaded studs extending through slots 285 formed in plate 277.

In this embodiment of the invention, the lift apparatus 74C is similar to apparatus 74 except that it is positioned at 90 degrees with respect to the manner in which the apparatus 74 is mounted in wheeled frame 72. Frame 72C of carriage 40C rides on suitable casters 275, and conveyor 43C is the same as conveyor 43. Conveyor 38C is similar to conveyor 38 except that it is disposed in the illustrated inclined position.

In the embodiments of FIGURES 10–12, the carriage 40D comprises a frame 284 including side plates 286, a cross bar 288 and a bag stop plate 289 fixed together in any suitable manner to define an essentially open center frame as well as a slideway for the slide plate 139 that is pulled from the position of FIGURE 11 to the position of FIGURE 10 to discharge the mail bag tier 46 that is carried thereby onto the stack on which it is to be placed.

The side plates 286 on the outwardly facing sides thereof each journal a pair of rollers 290 that ride on the upper run 292 of the closed loop cable 128. Cable 128 has its ends closed together to form the indicated closed loop about pulleys 130 and 132 by an appropriate quick disconnect device so that when loading is completed and the carriage 40 is disposed outside the vehicle 14D, the cable 128 may have its ends disconnected and withdrawn from the vehicle.

The prop devices 150 for the respective cables 138 and movable supports 134 each comprise a suitable post member or bar 300 that is preferably quadrilateral in transverse cross-sectional configuration and is provided at its upper end with a bracket structure 302 that journals a pulley 304 over which the respective cables 138 are trained (on either side of the vehicle). The bars 300 are secured in any suitable manner to the truck at their lower ends and at the bracket structure 302.

The cables 138 are connected to the respective supports 134 as at 306 and extend upwardly about the pulleys 304 and then to the rear of the vehicle about a pulley 307 (see FIGURE 12) carried by U-shaped support structure 308 that is mounted on the loading dock 12D in overlying relationship to the conveyor 38D. From the pulley wheel 307 on either side of the support structure 308 the respective cables 138 proceed about a second pulley 310 and then have their ends 311 suitably removably anchored to a cross bar 312 which carries the respective supports 136. The cross bar 312 moves vertically along trackway 316 defined by the respective uprights 314.

The conveyor 38D is in the form of a lower upwardly inclined section 280 and an upper generally horizontal section 282, in which the conveyor section 282 is supported in any suitable manner on the cross bar 312 and is pivotally connected to the conveyor section 280 (as at 317), which at its lower end rides on rollers 281 as the cross bar 312 moves up and down. Rollers 281 are journalled on frame 202D of section 280 in any suitable manner. Sections 280 and 282 are belt conveyors arranged in a manner similar to conveyor 38.

On either side of the support 308 the cross bar 312 is connected to an endless chain 318 trained over sprockets 320 and 322 (see FIGURE 12), with the sprockets 322 being driven by a suitable electric motor 324. Operation of the motor 324 in either direction serves to actuate cross bar 312 and simultaneously raise and lower the supports 134 and 136 as required to facilitate the stacking of the mail bags.

It is also preferred that the end pulleys 132 be driven through a motor (not shown) carried on cross bar 312, so that the carriage 40D is moved mechanically, and that a similar motor (not shown) be carried by cross bar 312 for winding up reels to which cables 140 are respectively attached for pulling cables 140 to retract the slide plate 138 when unloading of the mail bags from the carriage 40D is desired, with the drive for the latter motor being arranged so that cables 140 pull out readily from their reels when the carriage 40D is moved toward the desired bag tier load discharging position. This may be done in any suitable manner.

In the embodiment of FIGURE 13, the sides 182E of conveyor 43E carry the clamping devices 130E that fix the carriage 40E to the cable 128E. The conveyor frame 180E of conveyor 43E includes side plates 256E on which are journalled the rollers 240E that ride on the upper run 292 of cable 128E.

Referring now to the embodiment of FIGURES 14–18, the wheeled frame 72F of carriage 40F is the same as frame 72 with its cross-levers 190F and 192F operating in suitable ways formed in vertically movable platform 45F on which belt conveyor 43F is operably mounted.

Conveyor 43F is arranged similar to conveyor 43 and includes limit switch 56F that is similar in purpose to switch 56. Unloading mechanism 155 comprises swing arm 350 journalled in support 352 carried by frame 45F and operated by suitable motor 354 from central control board 35F. Conveyor 43F is operated by suitable motor 356 through suitable pulley belt or chain 358, and conveyor 38F, which is arranged in a manner similar to conveyor 38, is similarly operated through suitable motor 358 (suitably supported by frame 202F). The frame 202F of conveyor 38F includes vertical pin structure 360 that is suitably journalled in platform 45F at 157.

At the end 158 of conveyor 38F, the pivotal connection 159 comprises an elongated plate member 362 pivotally connected to vertical pin structure 364 that is fixed to frame 202F, and is adapted to seat in one of the slots 366 formed in dock surface 16F at a suitable unloading station or position for carriage 40F. The frame 180F of conveyor 43F is mounted for sidewise movement on support bars 368 of frame 45F and is adapted to be moved sidewise of the vehicle by rotating screw 370 journalled in frame 45F that cooperates with nuts 372 secured to frame 45F. Screw 370 is rotated by suitable motor 374. Frame 45F is raised and lowered by operating motor 376 to rotate screw 378 journalled in frame 72F and cooperating with a suitable nut structure 380 operably connected to cross lever 190F.

The embodiment of FIGURES 14–18 is operated by using motor 76F to drive carriage 40F into the empty vehicle 14, with the conveyor 38F and its end 158 supported above the dock surface 16F in any suitable manner. When switch 56F engages the vehicle forward wall, forward motion of carriage 40F ceases, it remains stationary, and the plate 362 of conveyor 38F entered in the slot 366 nearest dock end 18F. Conveyor 43F is then positioned to one side of vehicle 14 to drop the first tier 46F into place (see FIGURE 16) and the two bags forming this tier are applied to conveyor 38F and conveyed to the unloading position indicated by FIGURES 15 and 16, whereupon swing arm 350 is swung between the positions of FIGURES 16 and 18 to drop the first tier 46F into loaded position (FIGURE 18). This action is repeated with conveyor 43F being moved transversely of the vehicle as is necessary to form the first layer 382 of bags at the inner end of the vehicle 14; to drop the last tier or two on the side of the vehicle opposite that shown in FIGURES 16–18, the conveyor 43F and swing arm 350 are positioned and operated to drop the tier off the other side of conveyor 43F to fill the space between the vehicle side wall 28 and the bags already in place. The next layer 384 of bags is stacked on top of the first layer 382 by repeating the operations just described with conveyor 43F elevated as is necessary to bring the additional bags in over those already in place. After the vehicle has been loaded vertically to the capacity permitted by apparatus 10F, the carriage 40F is moved rearwardly to its next loading position, wherein the pivot plate of conveyor 38F is seated in the next slot 366, and the loading operations repeated. This continues until loading of the vehicle 14 is completed. As conveyor 43F shifts laterally of the vehicle, conveyor 38F swings with it and plate 362 shifts longitudinally of the slot 366 in which it is seated.

For all embodiments of the invention, the operations of the conveyors and bag carrying carriages are operated from a control panel 35, or the like, located outside of the vehicle, through any suitable wiring arrangement, and ordinarily only a single operator will be needed to both load the bags on the dock supported conveyor and operate the machines to deposit the bags in the vehicle 14. The machines can readily be controlled to avoid dropping the bags further than the 24 inch limitation prescribed by the Post Office Department.

The bag stacking arrangements of this invention will load trucks and trailers in a fraction of the time now required and at less than half the cost, while at the same time greatly reducing the effort required by workers handling the bags. This not only greatly reduces the tie up time for each truck, but also significantly reduces the overall cost of mail bag handling.

While many of the herein disclosed specific embodiments and methods are concerned with the loading of the mail bags into the highway vehicle in such a manner that the bags will extend longitudinally of the vehicle, this feature is optional though preferred as it comports with the way the bags are oriented in their final loaded position following the manual and semi-manual conventional procedures that have heretofore been referred to. However, the loading arrangements suggested by FIGURES 19–21 achieve the same objects insofar as compactness of loading is concerned, and the random positioning of FIGURES 19 and 20 is preferable where the bags vary widely in size throughout the load. As to all described embodiments and methods herein disclosed, the load units or tiers formed on the loading dock are termed "partial transport vehicle load depth unit" in the appended claims.

The foregoing description and the drawings are given merely to explain and illustrate my invention and the invention is not to be limited thereto since those skilled in the art who have my disclosure before them will be able to make modifications and variations therein without departing from the scope of the invention.

I claim:

1. A bulk mail handling method for loading elongated mail bags from a loading dock into the load receiving body of an end loading transport vehicle through the end opening thereof when the vehicle is backed into load receiving position in juxtaposition to the dock to dispose its end opening to receive the bags from the dock, and stacking same in the load receiving area of the vehicle, without workers on the dock handling the bags having to enter the vehicle and without requiring that pallets be employed or remain with the bags after the bags are loaded into the vehicle, which method comprises:

forming on the loading dock adjacent the vehicle end opening a partial transport vehicle load depth unit made up of a plurality of said bags arranged in tier form in closely spaced compact relation with the tier extending transversely of the vehicle and the bags of the tier oriented to have the positioning relative to each other that they will have in the load resting position thereof, and with the tier aligned with the vehicle end opening longitudinally of the vehicle and having a length to extend the width of the vehicle body load receiving area when in the load resting position thereof, conveying said unit onto a carrier positioned in alignment with said vehicle end opening while maintaining said orientation, mechanically moving said carrier with said unit thereon into the vehicle load receiving area to a preselected load resting position while maintaining said orientation, depositing the load unit free of any supporting pallet into said position while maintaining said orientation, and repeating said forming, conveying, moving and depositing steps to form subsequent load units of additional mail bags having said orientation and dispose said units in said positions predetermined in location to arrange the mail bags in closely spaced multiple tier stacks extending consecutively from the inner end of said area to the vehicle end opening.

2. A bulk mail handling method for loading elongated mail bags from a loading dock into the load receiving body of an end loading transport vehicle through the end opening thereof when the vehicle is backed into load receiving position in juxtaposition to the dock to dispose its end opening to receive the bags from the dock, and stacking same in the load receiving area of the vehicle, without workers on the dock handling the bags having to enter the vehicle and without requiring that pallets be employed or remain with the bags after the bags are loaded into the vehicle, which method comprises:

positioning on the loading dock adjacent the vehicle end opening and in alignment therewith a partial transport vehicle load depth unit made up of a number of said bags arranged in tier form in closely spaced compact relation, with the tier extending transversely of the vehicle and the bags oriented to have the position relative to each other that they will have in the load resting position thereof, and the tier having a length to extend the width of the vehicle body load receiving area when in the load resting position thereof, mechanically moving said unit into the vehicle load receiving area to the inner end thereof while maintaining the orientation of the bags as disposed by said positioning step, depositing the load unit free of any supporting pallet at said inner end of said area while maintaining said orientation, positioning on the loading dock adjacent the vehicle end opening and in alignment therewith a like mail bag load unit of additional mail bags while said unit is being moved into the vehicle, mechanically moving said like unit into said load receiving area adjacent the first mentioned unit while maintaining said orientation thereof, depositing the said like unit adjacent the first mentioned unit, and similarly positioning, moving and depositing subsequent like load units of additional mail bags to form closely spaced multiple tier stacks of said mail bags extending consecutively from the inner end of said area to the vehicle end opening.

3. A bulk mail handling method for loading elongated mail bags from a loading dock into the load receiving body of an end loading transport vehicle through the end opening thereof when the vehicle is backed into load receiving position in juxtaposition to the dock to disposed its end opening to receive the bags from the dock, and stacking same in the load receiving area of the vehicle, without workers on the dock handling the bags having to enter the vehicle and without requiring that pallets be employed or remain with the bags after the bags are loaded into the vehicle, which method comprises:

positioning on the loading dock at a position adjacent the vehicle end opening and in alignment therewith a partial transport vehicle load depth unit made up of a number of said bags arranged in tier form in closely spaced compact relation, with the tier extending transversely of the vehicle and the bags oriented to have the positioning relative to each other that they will have when stacked in the vehicle, and the tier having a length to extend the width of the vehicle body load receiving area when stacked in the vehicle, mechanically moving said unit from said position into the vehicle receiving area and depositing same thereon while maintaining the orientation of the bags as disposed by said positioning step and simultaneously positioning a like mail bag load unit at said position of additional bags similarly spaced, then mechanically moving said like unit into the vehicle receiving area and depositing same therein while maintaining said orientation and simultaneously positioning a subsequent like mail bag load unit at said position, and repeating said positioning, mechanical moving, and depositing steps to form closely spaced stacks of said tiers of said mail bags within said load receiving area extending consecutively from the inner end of said area to the vehicle open end.

4. The method set forth in claim 3 wherein: the bags of the partial transport vehicle load depth unit are oriented to extend longitudinally of the vehicle.

5. The method set forth in claim 3 wherein: the bags of the partial transport vehicle load depth unit are oriented to extend transversely of the vehicle in a substantially aligned end to end relation.

6. The method set forth in claim 3 wherein: the bags of the partial transport vehicle load depth unit are arranged in random position form.

7. A bulk mail handling method for loading elongated mail bags from a loading dock into the load receiving body of an end loading transport vehicle through the end opening thereof when the vehicle is backed into load receiving position in juxtaposition to the dock to dispose its end opening to receive the bags from the dock and stacking same in the load receiving area of the vehicle, without workers on the dock handling the bags having to enter the vehicle and without requiring that pallets be employed or remain with the bags after the bags are loaded into the vehicle, which method comprises:

forming on the loading dock adjacent the vehicle end opening a partial transport vehicle load depth unit made up of a plurality of said bags arranged in tier form in closely spaced compact relation with the tier extending transversely of the vehicle and the bags of the tier oriented to have the positioning relative to each other that they will have in the load resting position thereof, and with the tier aligned with the vehicle end opening longitudinally of the vehicle and having a length to extend the width of the vehicle body load receiving area when in the load resting position thereof, conveying said unit onto a wheeled carrier positioned in alignment with said vehicle end opening while maintaining said orientation, rolling said carrier with said unit thereon onto the vehicle load receiving area of the vehicle to a preselected load resting position while maintaining said orientation and while guiding said carrier along a predetermined path of movement that extends longitudinally of the vehicle, depositing the load unit free of any supporting pallet into said load resting position while maintaining said orientation, and repeating said forming, conveying, rolling and depositing steps to form subsequent load units of additional mail bags having said orientation and dispose said units in said positions predetermined in location to arrange the mail bags in closely spaced multiple tier stacks extending consecutively from the inner end of said area to the vehicle end opening.

References Cited

UNITED STATES PATENTS

| 1,534,797 | 4/1925 | McLeod | 214—41 |
| 2,107,569 | 2/1938 | Hamlin | 214—41 |
| 2,186,463 | 1/1940 | Maine | 214—38 |
| 2,208,208 | 7/1940 | Brooks | 214—41 X |
| 2,870,922 | 1/1959 | Thomson. | |
| 3,337,066 | 8/1967 | Reed et al. | |
| 3,381,828 | 5/1968 | Sheehan. | |
| 3,164,271 | 1/1965 | McWilliams. | |

FOREIGN PATENTS

| 595,542 | 7/1959 | Italy. |
| 1,278,535 | 10/1961 | France. |
| 116,200 | 1/1959 | Russia. |

GERALD M. FORLENZA, Primary Examiner

R. J. SPAR, Assistant Examiner

U.S. Cl. X.R.

214—6, 41